United States Patent
Park et al.

(10) Patent No.: US 9,638,802 B2
(45) Date of Patent: May 2, 2017

(54) UNMANNED AERIAL VEHICLE DETECTION METHOD USING GLOBAL POSITIONING SYSTEM LEAKAGE SIGNAL AND SYSTEM THEREFOR

(71) Applicant: Korea Advanced Institute of Science and Technology, Daejeon (KR)

(72) Inventors: Seong Ook Park, Daejeon (KR); Rao Shahid Aziz, Daejeon (KR); Myung Hun Jeong, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 14/931,026

(22) Filed: Nov. 3, 2015

(65) Prior Publication Data
US 2016/0358483 A1 Dec. 8, 2016

(30) Foreign Application Priority Data
Jun. 4, 2015 (KR) .................. 10-2015-0079355

(51) Int. Cl.
| | |
|---|---|
| G08G 5/04 | (2006.01) |
| G01S 19/01 | (2010.01) |
| G01S 13/91 | (2006.01) |
| G01S 11/06 | (2006.01) |
| G01S 13/00 | (2006.01) |
| H01Q 1/28 | (2006.01) |
| H01Q 21/20 | (2006.01) |

(52) U.S. Cl.
CPC .............. *G01S 19/01* (2013.01); *G01S 11/06* (2013.01); *G01S 13/003* (2013.01); *G01S 13/91* (2013.01); *H01Q 1/28* (2013.01); *H01Q 21/205* (2013.01)

(58) Field of Classification Search
CPC ...... H08G 5/0073; H01Q 21/061; H01Q 1/28; H01Q 21/205; G01S 19/01; G01S 11/06; G01S 13/003; G01S 13/91; B64C 39/024; B64C 2201/145
USPC ........... 340/933, 961; 342/146, 30, 453, 147
See application file for complete search history.

(56) References Cited

U.S. PATENT DOCUMENTS

| | | | | |
|---|---|---|---|---|
| 4,746,924 | A * | 5/1988 | Lightfoot | G01S 5/02 342/159 |
| 5,153,598 | A * | 10/1992 | Alves, Jr. | G01S 19/25 342/352 |
| 5,187,485 | A * | 2/1993 | Tsui | G01S 5/12 342/126 |
| 6,339,396 | B1 * | 1/2002 | Mayersak | G01S 3/54 342/357.34 |
| 7,737,878 | B2 * | 6/2010 | van Tooren | G01S 13/9303 244/3.1 |
| 2011/0169684 | A1 * | 7/2011 | Margolin | G01S 5/12 342/30 |
| 2014/0023381 | A1 * | 1/2014 | Hunt | H04B 10/112 398/207 |

* cited by examiner

*Primary Examiner* — Anh V La
(74) *Attorney, Agent, or Firm* — Fenwick & West LLP

(57) ABSTRACT

An unmanned aerial vehicle (UAV) detection method and a system therefor are provided. The UAV detection method includes receiving a radio signal from air, detecting a global positioning system (GPS) leakage signal of a predetermined frequency from the received radio signal, and determining that a UAV is detected when the GPS leakage signal is detected.

7 Claims, 3 Drawing Sheets

UNMANNED AERIAL VEHICLE DETECTION METHOD USING GLOBAL POSITIONING SYSTEM LEAKAGE SIGNAL AND SYSTEM THEREFOR

CROSS-REFERENCE TO RELATED APPLICATIONS

A claim for priority under 35 U.S.C. §119 is made to Korean Patent Application No. 10-2015-0079355 filed Jun. 4, 2015, in the Korean Intellectual Property Office, the entire contents of which are hereby incorporated by reference.

BACKGROUND

Embodiments of the inventive concepts described herein relate to technologies for detecting unmanned aerial vehicles (UAVs), and more particularly, to a UAV detection method for detecting UAVs using global positioning system (GPS) leakage signals of the UAVs in a radar system and a system therefor.

UAVs may be used to perform all air activities such as reconnaissance, bombing, and an air battle by being controlled from a remote site by a remote control source. UAVs may be used for purposes for reconnoitering risk areas, for example, reconnaissance works using relatively small landing/take-off areas and relatively small radar cross sections (RCSs).

These UAVs may be used as remote monitoring systems for monitoring states of people or facilities in a particular area or for obtaining activity intelligence in a specific area.

It is very difficult to detect small UAVs. It is because there is a need for a very sensitive radar system to distinguish a target from other moving objects such as swaying trees and flying birds or distinguish between different UAVs such as fixed-wing unmanned aerial systems (UASs) and quadcopters.

SUMMARY

Embodiments of the inventive concepts provide a UAV detection method for detecting a UAV using a GPS leakage signal generated from a GPS module mounted on the UAV and a system therefor.

One aspect of embodiments of the inventive concept is directed to provide an unmanned aerial vehicle (UAV) detection method. The UAV detection method may include receiving a radio signal from air, detecting a global positioning system (GPS) leakage signal of a predetermined frequency from the received radio signal, and determining that a UAV is detected when the GPS leakage signal is detected.

The determination that the UAV is detected may include determining that the UAV is detected, when a harmonic frequency signal of the GPS leakage signal is detected.

The determination that the UAV is detected may include determining that the UAV is detected, when at least one of a second harmonic frequency signal or a third harmonic frequency signal of the GPS leakage signal is detected.

The receiving of the radio signal may include receiving the radio signal using a circular cylindrical active array (CCAA) antenna.

The UAV detection method may further include displaying information corresponding to the detected UAV when the UAV is detected.

The detection of the GPS leakage signal may include detecting the GPS leakage signal generated from a GPS module according to information about an oscillator mounted on the GPS module of the UAV.

Another aspect of embodiments of the inventive concept is directed to provide an unmanned aerial vehicle (UAV) detection method. The UAV detection method may include setting information about a UAV to be detected, receiving a radio signal from air, detecting a global positioning system (GPS) leakage signal of a frequency corresponding to the set UAV information from the received radio signal, and determining that the UAV is detected when the GPS leakage signal is detected.

Another aspect of embodiments of the inventive concept is directed to provide an unmanned aerial vehicle (UAV) detection system. The UAV detection system may include a reception means configured to receive a radio signal from air, a detection means configured to detect a global positioning system (GPS) leakage signal of a predetermined frequency from the received radio signal, and a detection means configured to determine that a UAV is detected when the GPS leakage signal is detected.

The determination means may determine that the UAV is detected, when a harmonic frequency signal of the GPS leakage signal is detected.

The determination means may determine that the UAV is detected, when at least one of a second harmonic frequency signal or a third harmonic frequency signal of the GPS leakage signal is detected.

The reception means may receive the radio signal using a circular cylindrical active array (CCAA) antenna.

The UAV detection system may further include a display means configured to display information corresponding to the detected UAV when the UAV is detected.

The detection means may detect the GPS leakage signal generated from a GPS module according to information about an oscillator mounted on the GPS module of the UAV.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
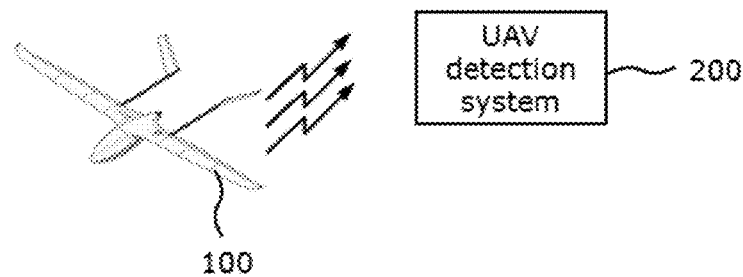
FIG. 1 is a drawing illustrating a system according to an exemplary embodiment of the inventive concept.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Hereinafter, a description will be given in detail for exemplary embodiments of the inventive concept with reference to the accompanying drawings. While limited exemplary embodiments of the inventive concept are described below, these exemplary embodiments are examples of the inventive concept. Therefore, these exemplary embodiments of the inventive concept may be easily modified by those skilled in the art.

Exemplary embodiments of the inventive concept have the subject matter of detecting an unmanned aerial vehicle (UAV) using a global positioning system (GPS) leakage signal generated from the UAV which mounts a GPS module.

Herein, the GPS leakage signal may be generated by an oscillation of an oscillator included in the GPS module or a device of the UAV and may be generated during a simultaneous GPS (S-GPS) operation in which the reception of a GPS signal and the transmission of a data signal simultaneously occur.

FIG. 1 is a drawing illustrating a system according to an exemplary embodiment of the inventive concept.

As shown in FIG. 1, a UAV detection system 200 according to an exemplary embodiment of the inventive concept may be a system which detects a UAV 100 according to whether a GPS leakage signal which is generated by the UAV 100 is detected and is wirelessly transmitted.

The UAV 100 may mount a GPS module which has an operating frequency such as 1.57542 GHz. The GPS module may include an oscillator for generating an intermediate frequency (IF) signal, a local oscillator (LO) signal, and the like or obtaining a desired output. The oscillator may generate a leakage signal including the addition and subtraction of harmonic frequencies. As such, the GPS leakage signal generated by the UAV 100 may be generated by an oscillation of an oscillator included in a GPS module or a device. Also, the GPS leakage signal generated by the UAV 100 may be generated during a simultaneous GPS (S-GPS) operation in which the reception of a GPS signal and the transmission of a data signal simultaneously occur. A GPS receiver may generate a GPS leakage signal in a specific time.

The UAV detection system 200 according to an exemplary embodiment of the inventive concept may be a system which detects the UAV 100 by detecting the GPS leakage signal. Specifically, the UAV detection system 200 may detect the UAV 100 by detecting a second harmonic frequency signal and a third harmonic frequency signal of the GPS leakage signal. In other words, the UAV detection system 200 may detect the UAV 100 using a frequency of the GPS leakage signal.

Figure 2:
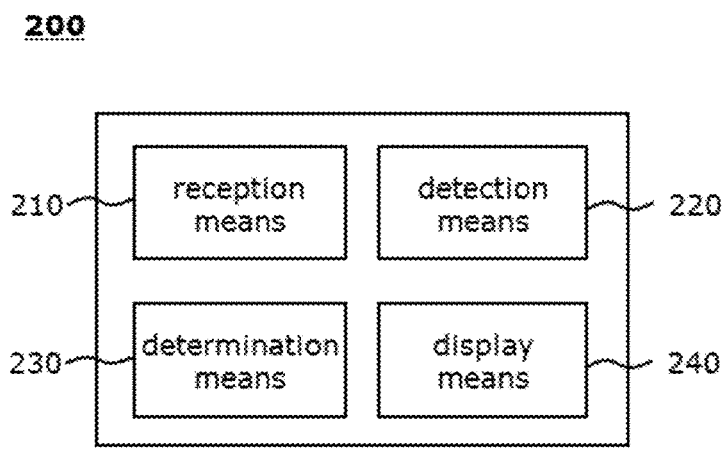
FIG. 2 is a block diagram illustrating a configuration of an unmanned aerial vehicle (UAV) detection system according to an exemplary embodiment of the inventive concept.
Figure 3:
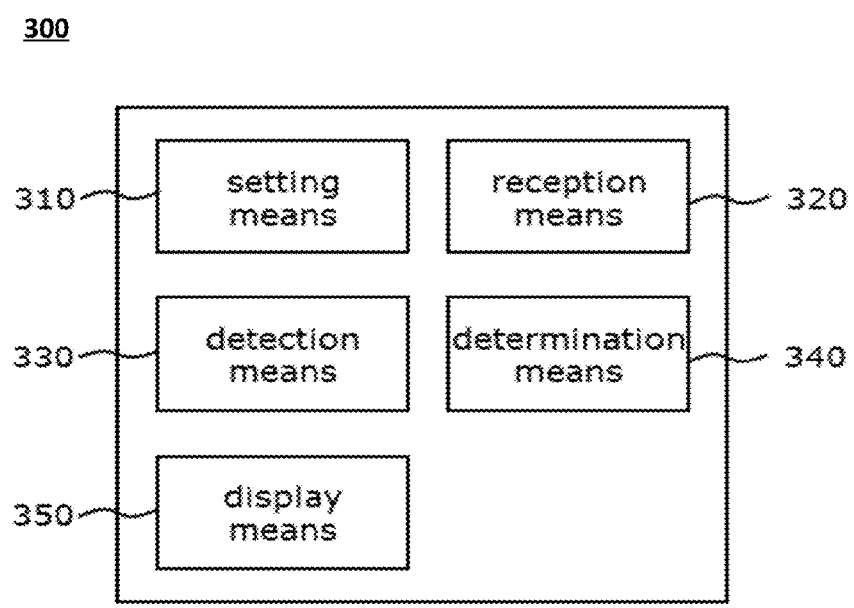
FIG. 3 is a block diagram illustrating a configuration of a UAV detection system according to another exemplary embodiment of the inventive concept.

A description is given of this UAV detection system according to an exemplary embodiment of the inventive concept with reference to FIGS. 2 and 3.

FIG. 2 is a block diagram illustrating a configuration of a UAV detection system according to an exemplary embodiment of the inventive concept.

Referring to FIG. 2, a UAV detection system 200 according to an exemplary embodiment of the inventive concept may include a reception means 210, a detection means 220, a determination means 230, and a display means 240.

The reception means 210 may receive a radio signal including a GPS leakage signal from air.

The reception means 210 may receive a radio signal of the air using a circular cylindrical active array (CCAA) antenna, for example, an 8×8 CCAA antenna system. A C-band CCAA antenna system may cover 360 degrees and may have 5 side 6×6 arrays in a vertical direction to perform an omnidirectional radar detection operation. Also, the CCAA antenna system may have a radar cross section (RCS) of analyzing a maximum detection range to detect a UAV with a maximum detection distance of 6.3 kilometers.

In other words, when a UAV passes a region within a range of a radar system, the reception means 210 may capture a GPS leakage signal generated by a GPS module of the UAV using the CCAA antenna system.

In this case, the description is given of the CCAA antenna system which receives the GPS leakage signal. The CCAA antenna system may transmit a radio signal to a radar range and may receive a reflection signal corresponding to the radio signal.

The detection means 220 may detect a GPS leakage signal of a predetermined frequency from the radio signal received by the reception means 210.

In this case, the detection means 220 may detect a GPS leakage signal from the radio signal received by the reception means 210 according to information about an oscillator mounted on a GPS module of a UAV, for example, a frequency of a signal generated by the oscillator. In other words, when oscillator information about various types of UAVs is set, the detection means 220 may detect GPS leakage signals for various types of UAVs.

The determination means 230 may determine whether a UAV is detected within a radar range according to a result of detecting the GPS leakage signal in the detection means 220.

In other words, when the GPS leakage signal is detected by the detection means 220, the determination means 230 may determine that a UAV is detected or present within a radar range. When the GPS leakage signal is not detected by the detection means 220, the determination means 230 may determine that a UAV is not present within the radar range.

In this case, when at least one of a second harmonic frequency signal or a third harmonic frequency signal of the GPS leakage signal is detected by the detection means 220, the determination means 230 may determine that a UAV is detected.

When the determination means 230 determines that the UAV is detected within the radar range, the display means 240 may display information corresponding to the detected UAV on its screen.

Herein, the display means 240 may display visual information about a type of the detected UAV or visual information about that the UAV is detected, for example, a UAV detection screen, and the like.

In this case, when the determination means 230 determines that the UAV is detected within the radar range, the display means 240 may digitalize information corresponding to the detected UAV and may display the digitalized information on the screen.

FIG. 3 is a block diagram illustrating a configuration of a UAV detection system according to another exemplary embodiment of the inventive concept. In FIG. 3, information about a UAV to be detected is set and it is determined whether the UAV for the set information is detected.

Referring to FIG. 3, a UAV detection system 300 according to another exemplary embodiment of the inventive concept may include a setting means 310, a reception means 320, a detection means 330, a determination means 340, and a display means 350.

The setting means 310 may set information about a UAV to be detected.

In this case, the setting means 310 may set information for detecting a GPS leakage signal of the UAV to be detected, for example, frequency information about an oscillator or a frequency of a GPS leakage signal, and the like.

The reception means 320 may receive a radio signal including a GPS leakage signal from air.

The reception means 320 may receive a radio signal of the air using a CCAA antenna, for example, an 8×8 CCAA antenna system. In other words, when a UAV passes a region within a range of a radar system, the reception means 320 may capture a GPS leakage signal generated by a GPS module of the UAV using the CCAA antenna system.

In this case, the description is given of the CCAA antenna system which receives the GPS leakage signal. The CCAA antenna system may transmit a radio signal to a radar range and may receive a reflection signal corresponding to the radio signal.

The detection means 330 may detect a GPS leakage signal of a frequency corresponding to the UAV information set by the setting means 310 from the radio signal received by the reception means 320.

For example, the detection means 330 may detect a GPS leakage signal from the radio signal received by the reception means 320 according to information about an oscillator, which is set by the setting means 310, for example, a frequency of a signal generated by the oscillator. In other words, when oscillator information about various types of UAVs is set by the setting means 310, the detection means 330 may detect GPS leakage signals for various types of UAVs.

The determination means 340 may determine whether a UAV is detected within a radar range according to a result of detecting the GPS leakage signal in the detection means 330.

In other words, when the GPS leakage signal is detected by the detection means 330, the determination means 340 may determine that a UAV is detected or present within a radar range. When the GPS leakage signal is not detected by the detection means 330, the determination means 340 may determine that a UAV is not present within the radar range.

In this case, when at least one of a second harmonic frequency signal or a third harmonic frequency signal of the GPS leakage signal is detected by the detection means 330, the determination means 340 may determine that a UAV is detected.

When the determination means 340 determines that the UAV is detected within the radar range, the display means 350 may display information corresponding to the detected UAV on its screen.

Herein, the display means 350 may display visual information about a type of the detected UAV or visual information about that the UAV is detected, for example, a UAV detection screen, and the like.

In this case, when the determination means 340 determines that the UAV is detected within the radar range, the display means 350 may digitalize information corresponding to the detected UAV and may display the digitalized information on the screen.

As such, the UAV detection system according to exemplary embodiments of the inventive concept may detect the UAV which is preset within the radar range by detecting the GPS leakage signal generated from the GPS module mounted on the UAV.

Figure 4:
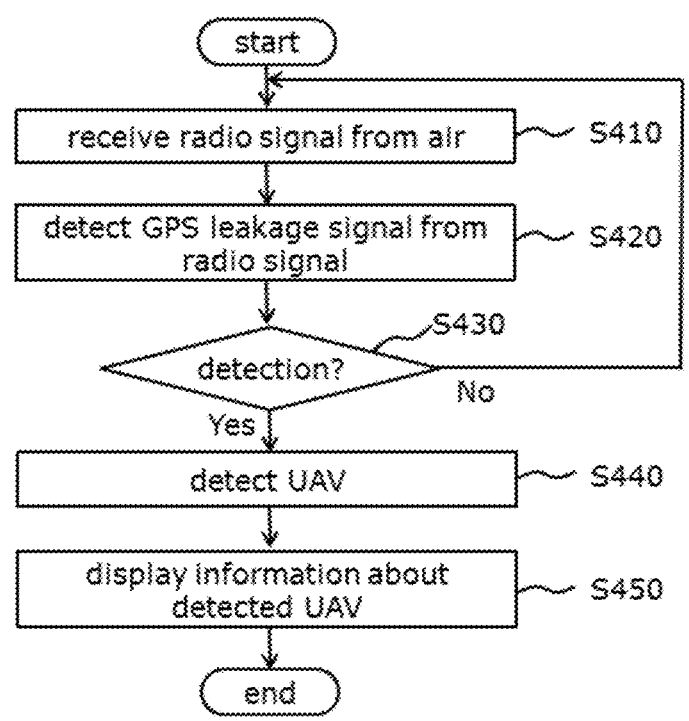
FIG. 4 is a flowchart illustrating an operation of a UAV detection method according to an exemplary embodiment of the inventive concept.

FIG. 4 is a flowchart illustrating an operation of a UAV detection method according to an exemplary embodiment of the inventive concept. FIG. 4 is a flowchart illustrating an operation of a UAV detection system shown in FIG. 2.

Referring to FIG. 4, in a UAV detection method according to an exemplary embodiment of the inventive concept, in step S410, a reception means 210 of FIG. 2 may receive a radio signal including a GPS leakage signal from air.

In step S410, the reception means 210 may receive a radio signal of the air using a CCAA antenna, for example, an 8×8 CCAA antenna system. In other words, in step S410, when a UAV passes a region within a range of a radar system, the reception means 210 may capture a GPS leakage signal generated by a GPS module of the UAV using the CCAA antenna system.

In this case, the description is given of the CCAA antenna system which receives the GPS leakage signal. The CCAA antenna system may transmit a radio signal to a radar range and may receive a reflection signal corresponding to the radio signal.

When the reception means 210 receives the radio signal from the air in step S410, in step S420, a detection means 220 of FIG. 2 may detect a GPS leakage signal of a predetermined frequency from the received radio signal.

In this case, in step S420, the detection means 220 may detect a GPS leakage signal from the radio signal received by the reception means 210 according to information about an oscillator mounted on a GPS module of a UAV, for example, a frequency of a signal generated by the oscillator. In other words, when oscillator information about various types of UAVs is set, in step S420, the detection means 220 may detect GPS leakage signals for various types of UAVs.

A determination means 230 of FIG. 2 may determine whether a UAV is within a radar range detected according to a result of detecting the GPS leakage signal in step S420 in the detection means 220. When the GPS leakage signal is detected in step S430 by the detection means 220, the determination means 230 may determines that a UAV is detected or present within the radar range in step S440. When the GPS leakage signal is not detected in step S430 by the detection means 220, the determination means 230 may determines that a UAV is not present within the radar range.

In this case, the determination means 230 may determine whether at least one of a second harmonic frequency signal or a third harmonic frequency signal of the GPS leakage signal is detected in step S430 by the detection means 220. When the at least one of the second harmonic frequency signal or the third harmonic frequency signal of the GPS leakage signal is detected by the detection means 220, the determination means 230 may determine that a UAV is detected in step S440.

When the determination means 240 determines that the UAV is detected in step S440, a display means 240 of FIG. 2 may display information corresponding to the detected UAV on its screen in step S450.

Herein, in step S450, the display means 240 may display visual information about a type of the detected UAV or visual information about that the UAV is detected, for example, a UAV detection screen, and the like.

In this case, when the determination means 230 determines that the UAV is detected, the display means 240 may digitalize information corresponding to the detected UAV and may display the digitalized information on the screen in step S450.

Figure 5:
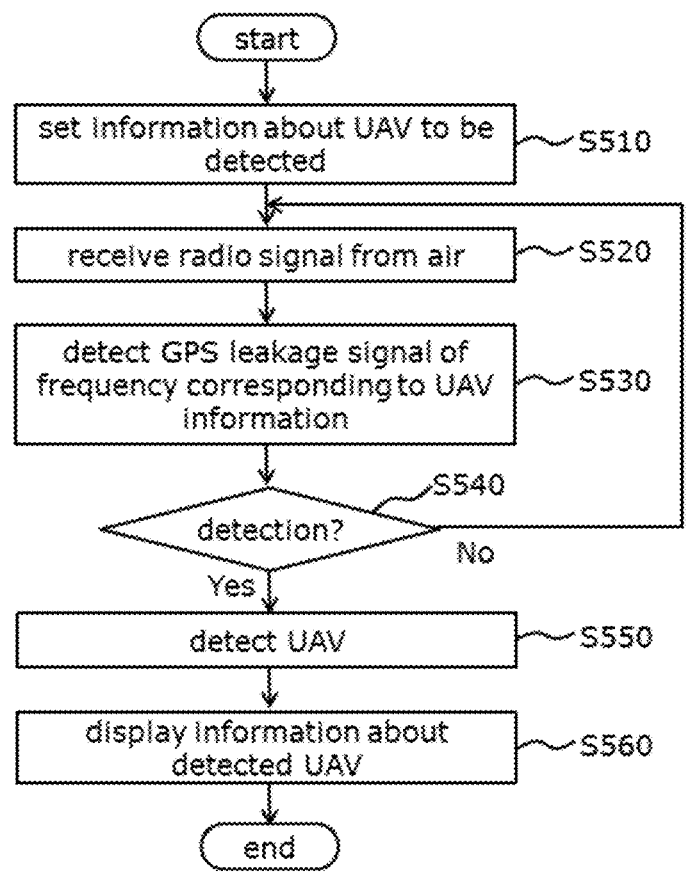
FIG. 5 is a flowchart illustrating an operation of a UAV detection method according to another exemplary embodiment of the inventive concept.

FIG. 5 is a flowchart illustrating an operation of a UAV detection method according to another exemplary embodiment of the inventive concept. FIG. 5 is a flowchart illustrating an operation of a UAV detection system shown in FIG. 3.

Referring to FIG. 5, in a UAV detection method according to another exemplary embodiment of the inventive concept, in step S510, a setting means 310 of FIG. 3 may set information about a UAV to be detected.

In this case, in step S510, the setting means 310 may set information for detecting a GPS leakage signal of the UAV to be detected, for example, frequency information about an oscillator or a frequency of a GPS leakage signal, and the like.

In step S520, a reception means 320 of FIG. 3 may receive a radio signal including a GPS leakage signal from air.

In step S520, the reception means 320 may receive a radio signal of the air using a CCAA antenna, for example, an 8×8 CCAA antenna system. In other words, when a UAV passes a region within a range of a radar system, in step S520, the reception means 320 may capture a GPS signal generated by a GPS module of the UAV using the CCAA antenna system.

In this case, the description is given of the CCAA antenna system which receives the GPS leakage signal. The CCAA antenna system may transmit a radio signal to a radar range and may receive a reflection signal corresponding to the radio signal.

When the reception means 320 receives the radio signal from the air in step S520, in step S530, a detection means 330 of FIG. 3 may detect a GPS leakage signal of a frequency corresponding to the UAV information set in step S510 by the setting means 310 from the received radio signal.

For example, in step S530, the detection means 330 may detect a GPS leakage signal from the radio signal received by the reception means 320 according to information about an oscillator, which is set in step S510 by the setting means 310, for example, a frequency of a signal generated by the oscillator. In other words, when oscillator information about various types of UAVs is set in step S510 by the setting means 310, in step S530, the detection means 330 may detect GPS leakage signals for various types of UAVs.

A determination means 340 of FIG. 3 may determine whether a UAV is detected according to a result of detecting the GPS leakage signal in step S530 by the detection means 330. When the GPS leakage signal is detected or preset in step S540 by the detection means 330, the determination means 340 may determine that a UAV is detected or present within a radar range in step S550. When the GPS leakage signal is not detected in step S540 by the detection means 330, the determination means 340 may determine that a UAV is not present within the radar range.

In this case, the determination means 340 may determine whether at least one of a second harmonic frequency signal or a third harmonic frequency signal of the GPS leakage signal is detected in step S540 by the detection means 330. When at least one of the second harmonic frequency signal or the third harmonic frequency signal of the GPS leakage signal is detected by the detection means 330, in step S550, the determination means 340 may determine that a UAV is detected.

When the determination means 340 determines that the UAV is detected in step S550 within the radar range, in step 560, a display means 350 of FIG. 3 may display information corresponding to the detected UAV on its screen.

Herein, in step S560, the display means 350 may display visual information about a type of the detected UAV or visual information about that the UAV is detected, for example, a UAV detection screen, and the like.

In this case, when the determination means 340 determines that the UAV is detected within the radar range, the display means 350 may digitalize information corresponding to the detected UAV and may display the digitalized information on the screen in step S560.

According to exemplary embodiments of the inventive concept, the UAV detection system may accurately detect a UAV although other moving objects, such as swaying trees and flying birds, are present by detecting the UAV using a GPS leakage signal generated from a GPS module mounted on the UAV.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. An unmanned aerial vehicle (UAV) detection method, comprising:
   receiving a reflection signal corresponding to a radio signal using a circular cylindrical active array (CCAA) antenna from air;
   detecting a global positioning system (GPS) leakage signal of a predetermined frequency from the received reflection signal by detecting one or more GPS leakage signals for at least one of a plurality of different types of UAVs based on preset information about an oscillator associated with each of the plurality of different types of UAVs;
   determining that a UAV is detected when the GPS leakage signal is detected; and
   displaying visual information corresponding to the detected UAV responsive to the detection of the UAV.

2. The UAV detection method of claim 1, wherein the determining that the UAV is detected comprises:
   determining that the UAV is detected, when a harmonic frequency signal of the GPS leakage signal is detected.

3. The UAV detection method of claim 2, wherein the determining that the UAV is detected comprises:
   determining that the UAV is detected, when at least one of a second harmonic frequency signal or a third harmonic frequency signal of the GPS leakage signal is detected.

4. An unmanned aerial vehicle (UAV) detection method, comprising:
   setting UAV information about an oscillator that is associated with a plurality of different types of UAVs to be detected;
   receiving a reflection signal corresponding to a radio signal using a circular cylindrical active array (CCAA) antenna from air;
   detecting a global positioning system (GPS) leakage signal of a frequency corresponding to the set UAV information from the received reflection signal by detecting one or more GPS leakage signals for each of a plurality of different types of UAVs based on preset information about an oscillator associated with each of the plurality of different types of UAVs; and
   determining that at least one of the plurality of different types of UAVs is detected when the GPS leakage signal is detected.

5. An unmanned aerial vehicle (UAV) detection system, comprising:
   a reception means configured to receive a reflection signal corresponding to a radio signal using a circular cylindrical active array (CCAA) antenna from air;
   a detection means configured to detect a global positioning system (GPS) leakage signal of a predetermined frequency from the reflection signal by detecting one or more GPS leakage signals for at least one of a plurality of different types of UAVs based on preset information about an oscillator associated with each of the plurality of different types of UAVs;
   a detection means configured to determine that a UAV is detected when the GPS leakage signal is detected; and
   a display means configured to display visual information corresponding to the detected UAV when the UAV is detected.

6. The UAV detection system of claim 5, wherein the determination means determines that the UAV is detected, when a harmonic frequency signal of the GPS leakage signal is detected.

7. The UAV detection system of claim 6, wherein the determination means determines that the UAV is detected, when at least one of a second harmonic frequency signal or a third harmonic frequency signal of the GPS leakage signal is detected.

* * * * *